(12) United States Patent
Tian et al.

(10) Patent No.: US 10,432,918 B2
(45) Date of Patent: Oct. 1, 2019

(54) THREE-DIMENSIONAL DISPLAY DEVICE AND METHOD FOR THE SAME

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Hua Tian, Beijing (CN); Gang Zhou, Beijing (CN); Huiguang Yang, Beijing (CN); Zhengdong Zhang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 334 days.

(21) Appl. No.: 15/115,803

(22) PCT Filed: Nov. 26, 2015

(86) PCT No.: PCT/CN2015/095633
§ 371 (c)(1),
(2) Date: Aug. 1, 2016

(87) PCT Pub. No.: WO2016/201898
PCT Pub. Date: Dec. 22, 2016

(65) Prior Publication Data
US 2017/0150132 A1    May 25, 2017

(30) Foreign Application Priority Data
Jun. 19, 2015   (CN) .......................... 2015 1 0346635

(51) Int. Cl.
*G02B 27/22*    (2018.01)
*G02F 1/1335*   (2006.01)
(Continued)

(52) U.S. Cl.
CPC ......... *H04N 13/31* (2018.05); *G02B 27/2214* (2013.01); *G09G 3/003* (2013.01);
(Continued)

(58) Field of Classification Search
CPC .... G02B 27/2214; G02B 6/005; G02B 7/005; H04N 13/305; H04N 13/31
See application file for complete search history.

(56) References Cited

U.S. PATENT DOCUMENTS

2002/0130833 A1* 9/2002 Chiao .................. G06F 1/1609
                                                                 345/156
2002/0163732 A1* 11/2002 McKinley .......... G02B 27/2214
                                                                 359/619
(Continued)

FOREIGN PATENT DOCUMENTS

CN       101915997 A       12/2010
CN       101995693 A        3/2011
(Continued)

OTHER PUBLICATIONS

First Chinese Office Action dated Nov. 14, 2016; Appln. No. 201510346635.1.
(Continued)

*Primary Examiner* — Alison Slater (57) ABSTRACT

A three-dimensional display device and a controlling method for the same are disclosed. The three-dimensional display device includes: a display panel including a plurality of pixels arranged as an array, wherein the plurality of pixels includes left eye pixels and right eye pixels alternately arranged in each row or each column; a light-splitting device disposed as being parallel to the display panel and configured for projecting lights emitted by the left eye pixels and right eye pixels to different view areas, wherein there is a distance h between the light-splitting device and the display panel along a light emission direction of the display device;

(Continued)

and a distance adjusting device configured for adjusting the distance h between the light-splitting device and the display panel along the light emission direction of the display panel.

19 Claims, 3 Drawing Sheets

(51) Int. Cl.
    *H04N 13/00*         (2018.01)
    *H04N 13/31*         (2018.01)
    *H04N 13/368*       (2018.01)
    *G09G 3/3225*       (2016.01)
    *G09G 3/36*          (2006.01)
    *G09G 3/00*          (2006.01)
    *H04N 13/373*       (2018.01)

(52) U.S. Cl.
    CPC ......... *G09G 3/3225* (2013.01); *G09G 3/3648* (2013.01); *H04N 13/368* (2018.05); *H04N 13/373* (2018.05); *G09G 2354/00* (2013.01)

(56) References Cited

U.S. PATENT DOCUMENTS

| | | | | |
|---|---|---|---|---|
| 2003/0161040 A1* | 8/2003 | Ishii | ................... | G02B 27/2214 359/463 |
| 2003/0223120 A1* | 12/2003 | Li | ...................... | G02B 27/2214 359/619 |
| 2006/0050197 A1* | 3/2006 | Hu | ......................... | G02B 6/005 349/61 |
| 2009/0295909 A1* | 12/2009 | Levecq | .............. | G02B 27/2214 348/59 |
| 2011/0043714 A1* | 2/2011 | Chang | ................ | G02B 27/2285 349/15 |
| 2012/0033297 A1 | 2/2012 | Hsiao | | |
| 2014/0078268 A1* | 3/2014 | Watanabe | .......... | G02B 27/2214 348/54 |
| 2014/0132851 A1 | 5/2014 | Cossairt et al. | | |
| 2016/0252736 A1 | 9/2016 | Zhou et al. | | |

FOREIGN PATENT DOCUMENTS

| | | |
|---|---|---|
| CN | 202121716 U | 1/2012 |
| CN | 102572483 A | 7/2012 |
| CN | 102868894 A | 1/2013 |
| CN | 103852819 A | 6/2014 |
| CN | 103913847 A | 7/2014 |
| CN | 203838470 U | 9/2014 |
| CN | 104880831 A | 9/2015 |
| JP | 2013-142743 A | 7/2013 |

OTHER PUBLICATIONS

Second Chinese Office Action dated Jan. 24, 2017; Appln. No. 201510346635.1.

International Search Report and Written Opinion dated Mar. 18, 2016; PCT/CN2015/095633.

Third Chinese Office Action dated Apr. 13, 2017; Appln. No. 201510346635.1.

* cited by examiner

THREE-DIMENSIONAL DISPLAY DEVICE AND METHOD FOR THE SAME

FIELD OF THE ART

Embodiments of the disclosure relate to a three-dimensional display device and a controlling method for the same.

BACKGROUND

In recent years, the three-dimensional display technology has been focused more and more. The principle of the technology is to allow the left and right eyes of one person to receive different images, and the images information is superimposed and regenerated by the brain, thus realizing a three-dimensional effect.

Figure 1:
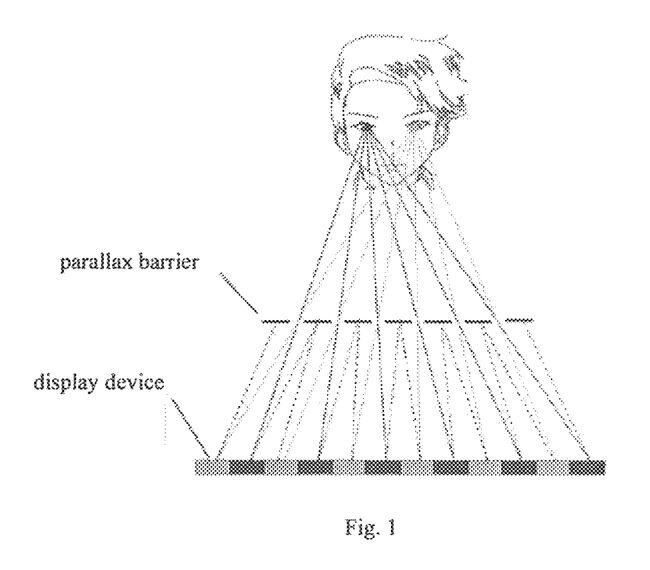
FIG. 1 schematically illustrates a parallax barrier type naked-eye three-dimensional (3D) display device.

The three-dimensional display technology is classified into two main implementations: naked-eye type and glasses type, wherein the naked-eye type three-dimensional display technology is more advantageous as no glasses are needed. The conventional naked-eye three-dimensional display technology allows the images of the left and right eyes to enter the left and right eyes of one person respectively through the light-splitting effect of a light-splitting device, and the light-splitting device typically includes a parallax barrier and lenticular lens. FIG. 1 schematically illustrates a parallax barrier type three-dimensional display device, wherein the slit grating selectively divide the image information into the left eye image information and the right eye image information.

However, the naked-eye type three-dimensional display technology has a problem that the position of viewpoint is fixed and the crosstalk increases drastically when leaving the viewpoint position. Particularly, when a distance between the viewer and the display panel is changed along a light emission direction of the display panel, that is, the human eyes move back and forth, the problem of the crosstalk of the 3D image needs to be solved.

SUMMARY

Embodiments of the disclosure provide a three-dimensional display device and a controlling method for the same, which can realize a 3D stereo display with crosstalk-free and a constant resolution under the circumstances that a distance between a viewer and a display panel changes continuously, and can realize a 3D display having a large 3D view distance.

An aspect of the disclosure provides a three-dimensional display device comprising: a display panel comprising a plurality of pixels arranged as an array, wherein the plurality of pixels comprises left eye pixels and right eye pixels alternately arranged in each row or each column; a light-splitting device disposed as being parallel to the display panel and configured for projecting lights emitted by the left eye pixels and right eye pixels to different view areas, wherein there is a distance h between the light-splitting device and the display panel along a light emission direction of the display device; and a distance adjusting device configured for adjusting the distance h between the light-splitting device and the display panel along the light emission direction of the display device.

Exemplarily, the distance adjusting device is configured for adjusting the distance h between the display panel and the light-splitting device and along the light emission direction of the display device along with a variation of a distance H between a viewer and the display panel along the light emission direction of the display device.

Exemplarily, the distance adjusting device comprises a plurality of screws, each of the plurality of screws is rotatable and has one end being fixed to the display panel and the other end passing through the light-splitting device therein.

Exemplarily, a plurality of screw holes having internal screw thread therein are formed in a frame of the light-splitting device, each of the screw holes corresponds to one of the screws, and each of the screws penetrates through a corresponding screw hole.

Exemplarily, the distance adjusting device comprises an air cushion which is disposed between the display panel and the light-splitting device and corresponds to frames of the light-splitting device and the display panel, and a gas storage capacity of the air cushion is adjustable.

Exemplarily, the distance adjusting device comprises a piezoelectric device which is disposed between the display panel and the light-splitting device and corresponds to frames of the light-splitting device and the display panel.

Exemplarily, the distance adjusting device comprises at least one pair of magnets and at least one spring, one of two magnets of the at least one pair of magnets is an electromagnet, one of the two magnets is disposed on the display panel and the other magnet is disposed on the light-splitting device, and an end of the at least one spring is fixed on the display panel and the other end is fixed on the light-splitting device.

Exemplarily, the three-dimensional display device further comprises a tracking module which is configured for detecting the distance H between the viewer and the display panel along the light emission direction of the display device.

Exemplarily, the three-dimensional display device further comprises an information processing module which is configured for receiving the distance H between the viewer and the display panel along the light emission direction of the display device detected by the tracking module, calculating a variation of the distance H, and calculating a variation of the distance h between the display panel and the light-splitting device according to the variation of the distance H so as to output a distance adjusting signal.

Exemplarily, the distance adjusting device further comprises a driving module which is configured for adjusting the distance h between the display panel and the light-splitting device according to the distance adjusting signal.

Exemplarily, the display panel may be an organic light emitting display panel and the light-splitting device is disposed on a light emission side of the display panel.

Exemplarily, the display panel is an organic light emitting display panel and the light-splitting device is disposed on a light emission side of the display panel.

Another aspect of the disclosure provides a controlling method for a three-dimensional display device, wherein the three-dimensional display device comprises: a display panel comprising a plurality of pixels arranged as an array, wherein the plurality of pixels comprises left eye pixels and right eye pixels alternately arranged in each row or each column; a light-splitting device disposed as parallel to the display panel and configured for projecting lights emitted by the left eye pixels and right eye pixels to different view areas, wherein there is a distance h between the light-splitting device and the display panel and along a light emission direction of the display device; and a distance adjusting device configured for adjusting the distance h between the light-splitting device and the display panel and along the light emission direction of the display device. The controlling method comprises: acquiring a distance adjust signal; and adjusting, by the distance adjusting device, the distance h between the light-splitting device and the display panel and along the light emission direction of the display device according to the distance adjusting signal.

Exemplarily, acquiring a distance adjusting signal comprises: acquiring the distance adjusting signal manually inputted by a viewer, or detecting a distance H between the viewer and the display panel along the light emission direction of the display device; acquiring a variation of the distance h between the display panel and the light-splitting device according to the distance H between the viewer and the display panel along the light emission direction so as to output the distance adjusting signal; and transmitting the distance adjusting signal to the distance adjusting device.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprises," "compris- ing," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Embodiments of the disclosure provide a three-dimensional (3D) display device and a controlling method for the same. The 3D display device comprises: a display panel comprising a plurality of pixels arranged as an array, wherein the plurality of pixels comprises left eye pixels and right eye pixels alternately arranged in each row or each column, a light-splitting device arranged parallel to the display panel and configured for projecting lights emitted by the left eye pixels and right eye pixels to different view areas, wherein there is a distance h between the light-splitting device and the display panel along a light emission direction of the display device; and a distance adjusting device configured for adjusting the distance h between the light-splitting device and the display panel along the light emission direction of the display device.

Through providing the distance adjusting device in the 3D display device, it is possible to allow the distance between the light-splitting device and the display panel to be adjustable, thus realizing a dynamic adjustment of the distance between the light-splitting device and the display panel when the distance between a viewer and the display panel is changed. In this case, comparing with a 3D display device having a fixed distance between the light-splitting device and the display panel which causes that a view distance of a viewer must be within a certain range to see a clear and crosstalk-free 3D image, it is possible to allow the viewer to see a clear and crosstalk-free 3D image when the distance between the viewer and the display panel changes continuously and is not within the view scope using the 3D display device in the embodiment of the disclosure, thereby improving stereoscopic viewing experience of the viewer.

The 3D display device and the controlling method for the same will be described in detail in connection with the appendix drawings. However, the disclosure includes but is not limited to the embodiments.

Figure 2:
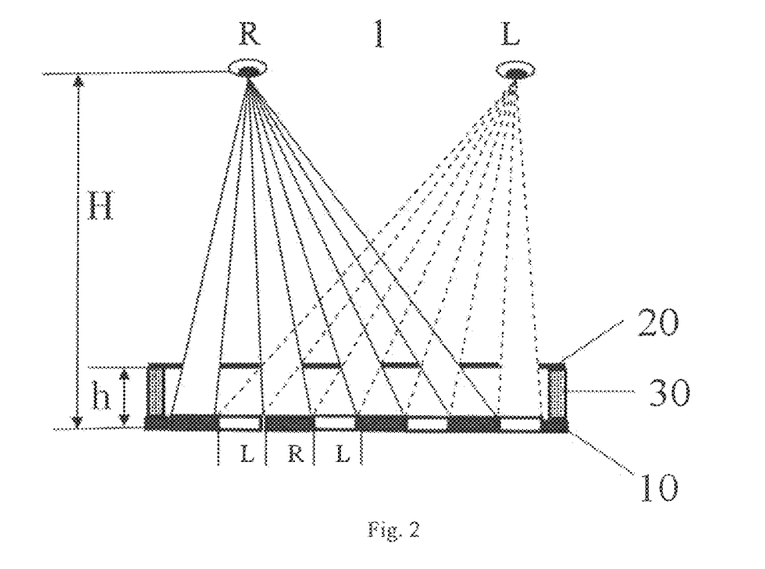
FIG. 2 schematically illustrates a top view of a three-dimensional display device in accordance with an embodiment of the disclosure.

The embodiment of the disclosure provides a 3D display device. FIG. 2 schematically illustrates the 3D display device. As illustrated in FIG. 2, the 3D display device comprises: a display panel 10 comprising a plurality of pixels arranged as an array, wherein the plurality of pixels comprises left eye pixels L and right eye pixels R alternately arranged in each row or each column; a light-splitting device 20 arranged parallel to the display panel 10 and configured for projecting lights emitted by the left eye pixels L and right eye pixels R to different view areas, so that images displayed by the left eye pixels enter the left eye of a viewer and images displayed by the right eye pixels enter the right eye of the viewer, wherein there is a distance h between the light-splitting device 20 and the display panel 10 along a light emission direction of the display device 10; and a distance adjusting device 30 configured for adjusting the distance h between the light-splitting device 20 and the display panel 10 along the light emission direction of the display device, such as a viewing direction of the viewer.

It is noted that, under 3D mode, the left eye pixels and right eye pixels in the plurality of pixels of the display panel are alternately arranged in each row. In this case, a grating bus of the light-splitting device, such as a center line of a grating bar of a slit grating, is along a vertical direction. Alternatively, the left eye pixels and right eye pixels in the plurality of pixels of the display panel are alternately arranged in each column. Correspondingly, the grating bus of the light-splitting device such as the center line of the grating bar of the slit grating is along a horizontal direction.

For the convenience of illustrative purpose, a parallax barrier is used as the light-splitting device in FIG. 2 to illustrate the 3D display device. It is noted that, the light-splitting device in the embodiment of the disclosure may also be lenticular lens. Furthermore, the parallax barrier may be a parallax barrier which can be switched between 2D and 3D realized through a liquid crystal cell. As an example, the 3D display is realized by applying voltage to electrodes in the liquid crystal cell so as to obtain a parallax barrier having light and shade stripes, and the 2D display is realized by setting the voltage difference between the electrodes as zero so as to make the liquid crystal cell being transparent. It is also possible to realize lenticular lens which can be switched between 2D and 3D through the liquid crystal cell. Certainly, the parallax barrier in the embodiment of the disclosure may also be fixed type slit grating or lenticular lens, and it will be elaborated herein.

Exemplarily, the distance h between the light-splitting device 20 and the display panel 10 can change along with the change of the distance H between the viewer and the display panel 10, and the change of the distance between the light-splitting device 20 and the display panel 10 is realized through the distance adjusting device 30.

When the distance between the viewer and the display panel changes, and the distance between the light-splitting device and the display panel is not adjusted, there will be crosstalk during the 3D display. However, through adjusting the distance between the light-splitting device and the display panel synchronously using the 3D display device in the embodiment of the disclosure, it is possible to eliminate the crosstalk caused by the back and forth movement of the human's eyes. The principle of crosstalk caused by the back and forth movement of the human's eyes will be briefly described in connection with FIGS. 3A to 3B.

Figure 3A:
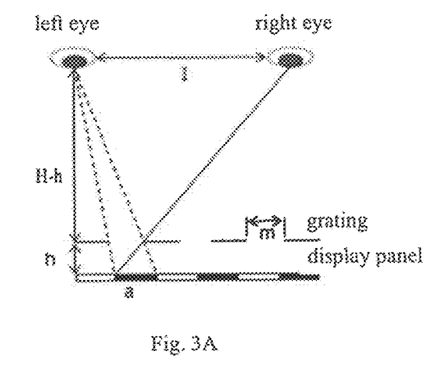
FIGS. 3A and 3B schematically illustrate a principle of crosstalk caused by the movement of human eyes back and forth.

As illustrated in FIG. 3A, an interpupillary distance of human's eyes is I, a distance between the human's eyes and the display panel is H, a distance between the slit grating and the display panel is h, a width of the pixel is a, and a distance between the human's eyes and the light-splitting device is H-h, according the triangle similarity principle, it is deduced that:

$$\frac{h}{H-h} = \frac{a}{I},$$

which can be transformed into $$h = \frac{a}{I+a}H \qquad (1)$$

and $$\frac{m}{a} = \frac{H-h}{H},$$

which can be transformed into $$m = \frac{a(H-h)}{H} \qquad (2)$$

In the above formulas (1) and (2), the interpupillary distance I of human's eyes is about 65 mm. In the existing display panel, the width a of the pixel is a constant. It is seen from the formula (1) that h∝H.

When the human's eyes move back and forth, that is, the H becomes H', if h does not change, it is seen from the formula (2)

$$m = \frac{a(H-h)}{H} = \frac{a'(H'-h)}{H'}$$

that, the width of the pixel seen by human's eyes becomes a' and $$a' = \frac{a(H-h)H'}{H(H'-h)}.$$

Figure 3B:
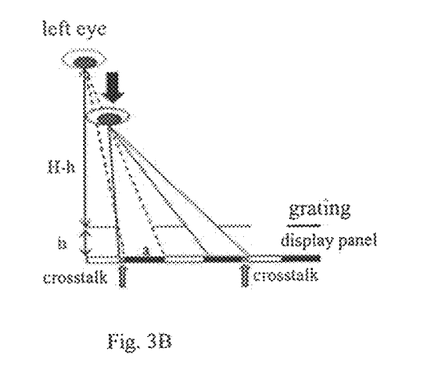

It is seen in connection with FIG. 3B that the left eye sees the right eye pixels, thereby causing the crosstalk.

It is seen from the above that, when a width of a slit of the slit grating m, and the width a of the pixel as well as the distance h between the light-splitting device and the display panel are all fixed, the viewing distance H is fixed. When the viewing distance H changes, the distance h between the light-splitting device and the display panel needs to change in a same proportion, so as to guarantee better 3D effect.

Due to the above fact, in the embodiment of the disclosure, when the distance between the viewer and the display panel changes, such as increases or decreases, it is possible to adjust the distance between the light-splitting device and the display panel in a same proportion through the distance adjusting device 30, that is, increasing the distance when H increases and decreasing the distance when H decreases, thereby eliminating the 3D crosstalk.

Figure 4:
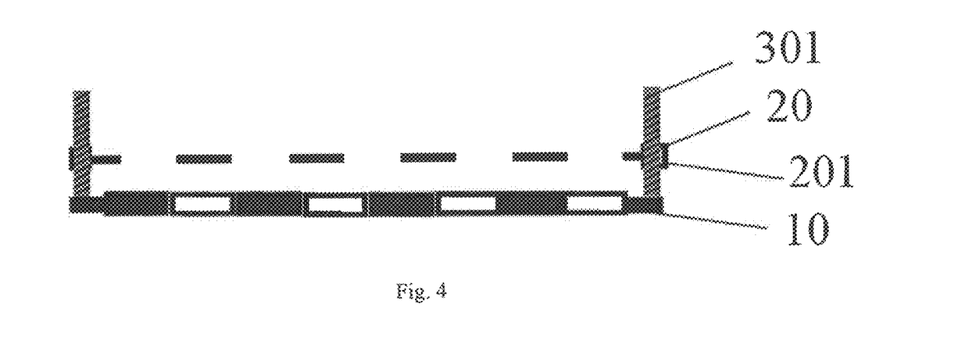
FIG. 4 schematically illustrates a cross section of a 3D display device in accordance with an embodiment of the disclosure.

Exemplarily, as illustrated in FIG. 4, the distance adjusting device 30 in the embodiment of the disclosure comprises a plurality of screws 301, each of the plurality of screws 301 is configured for being rotatable and has one end being fixed to the display panel 10 and the other end passing through the light-splitting device 20 therein. Furthermore, the distance adjusting device 30 may further comprises a driving module such as a stepper motor configured for such as driving each of the screws 301 to rotate synchronously.

Optionally, a plurality of screw holes 201 having internal screw thread therein are formed in frame of the light-splitting device 20, each of the screw holes corresponds to a screw 301. Correspondingly, the screws 301 may further be fixed in the frame of the display panel 10. When it is needed to change the distance h between the light-splitting device and the display panel, the screws may be driven to rotate by the stepper motor, because the screws holes having internal screw thread therein are formed in the frames, the light-splitting device will move forward or backward when the screws rotate, thereby changing the distance between the light-splitting device and the display panel.

It is noted that, although an end of the screw is fixed on the display panel 10, the rotation of the screw is not limited by the fixing when the screw rotates. Furthermore, the screw does not move relative to the display panel when the screw rotates.

Exemplarily, the number of the screws 301 is two and the two screws are arranged respectively on the centers of two opposite side edges of the frames of the display panel. As an example, the two screws are arranged respectively on the centers of left and right side edges of the display panel, or on the centers of top and bottom side edges of the display panel. Correspondingly, the screws holes in the frame of the light-splitting device may be arranged on the centers of left and right side edges or the centers of top and bottom side edges.

Exemplarily, the number of the screws 301 is four and the four screws are arranged respectively at corners of the frame of the display panel. Correspondingly, the screws holes in the frame of the light-splitting device are arranged at the four corners.

The number of the screws is not limited in the embodiment of the disclosure, as long as the screws can support the light-splitting device, allow the light-splitting device to be arranged parallel to the display panel and being assistant to change the distance between the light-splitting device and the display panel.

Figure 5:
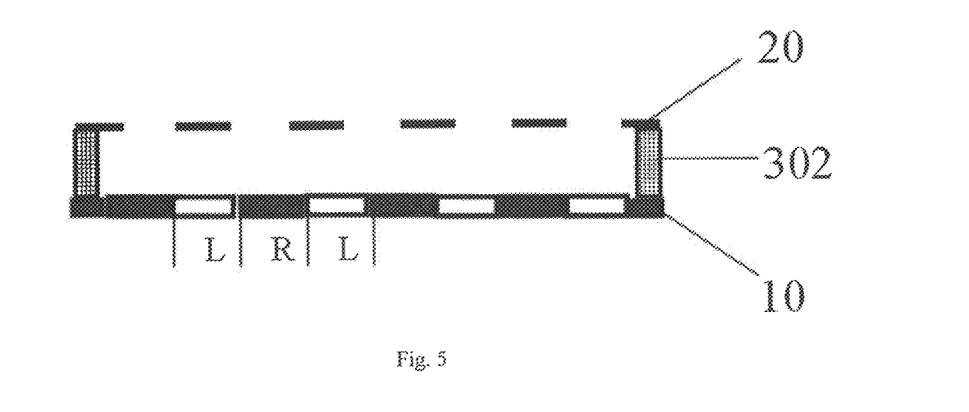
FIG. 5 schematically illustrates a cross section of another 3D display device in accordance with an embodiment of the disclosure.

Exemplarily, as illustrated in FIG. 5, the distance adjusting device 30 comprises an air cushion 302, the air cushion 302 is disposed between the display panel 10 and the light-splitting device 20. The air cushion 302 is sealed, and a gas storage capacity of the air cushion can be adjusted by the driving module. Because the air cushion may influence the light transmissivity, the air cushion 302 is disposed in the non-display region instead of the display region of the 3D display device, thereby not compromising the display effect. As an example, the air cushion 302 is arranged at a position corresponding to the frames of the light-splitting device 20 and the display panel 10.

Optionally, the air cushion 302 is in an annular shape; alternatively, the number of the air cushion is plural, and the plurality of air cushions are spaced apart from each other and arranged in the non-display region between the display panel and the light-splitting device. In a plane parallel to the display surface, a shape of the cross section of the air cushion may be a rectangle, a square, L shape and the like, and the L shape air cushion may be arranged at the corners of the frame.

It is noted that, the air cushion 302 may be arranged between the display panel and the light-splitting device in the following ways. As an example, a groove with a certain height (i.e., depth) is disposed on the frame of the display panel and the air cushion is fixed in the groove, or the air cushion is adhered to the frames of the display panel and the light-splitting device. The specific fixing method is not limited in the embodiment of the disclosure.

Exemplarily, the distance adjusting device 30 comprises a piezoelectric device disposed between the display panel and the light-splitting device. It is possible to apply electrical signals to the piezoelectric device and allow the piezoelectric device to deform in a certain degree, thereby adjusting the distance between the display panel and the light-splitting device. The exemplary configuration and driving of the piezoelectric device can be realized through general method, and it will not be elaborated herein.

Alternatively, the distance adjusting device 30 comprises at least one pair of magnets and at least one spring, wherein one of two magnets of the at least one pair of magnets is an electromagnet, and one of the two magnets is disposed on the display panel and the other magnet is disposed on the light-splitting device. An end of the at least one spring is fixed on the display panel and the other end is fixed on the light-splitting device. It is possible to allow the at least one pair of magnets disposed on the display panel and the light-splitting device respectively to generate forces different from one another through changing the magnetic forces of the electromagnets, and the force generated in the pair of magnets could balance a force generated in at least one spring, thereby adjusting the distance between the light-splitting device and the display panel.

Exemplarily, the other magnet of two magnets of the at least one pair of magnets is an electromagnet or a permanent magnet.

Exemplarily, the magnetic forces between the at least one pair of magnets may be repulsion or attraction. Correspondingly, the at least one spring is an extension spring which generates a force allowing the display panel to close to the light-splitting device or a compression spring which generates a force allowing the display panel to move away from the light-splitting device. Two or more pairs of magnets may be disposed between the display panel and the light-splitting device. If two pairs of magnets are disposed, the two magnets in each pair may be disposed on the centers of top and bottom side edges of the frame of the display panel or the light-splitting device, or disposed on the centers of left and right side edges of the frame of the display panel or the light-splitting device. If more than two pairs of magnets are disposed, the plurality of pairs of magnets may be disposed between the display panel and the light-splitting device evenly and spaced from each other, or may be disposed unevenly and spaced from each other. Correspondingly, each pair of magnets cooperates with at least one spring.

Exemplarily, the distance adjusting device 30 comprises a cam and a follower leaning against the cam, wherein an axle of the cam is fixed on the display panel, and an end of the follower leans against the cam and the other end is fixed on the light-splitting device.

As an example, the axle of the cam is fixed through fixing the axle of the cam to a vertical plate disposed on the display panel, thus the rotation plane of the cam is vertical to the display surface of the display panel. The follower may be fixed to a frame of the light-splitting device facing the display panel by means of such as a screw connection, rivet boding, etc. Furthermore, a chute or vertical tube configured for limiting the follower to swing is disposed on the frame of the light-splitting device facing the display panel. The cam is driven to rotate by the driving module.

Figure 6:
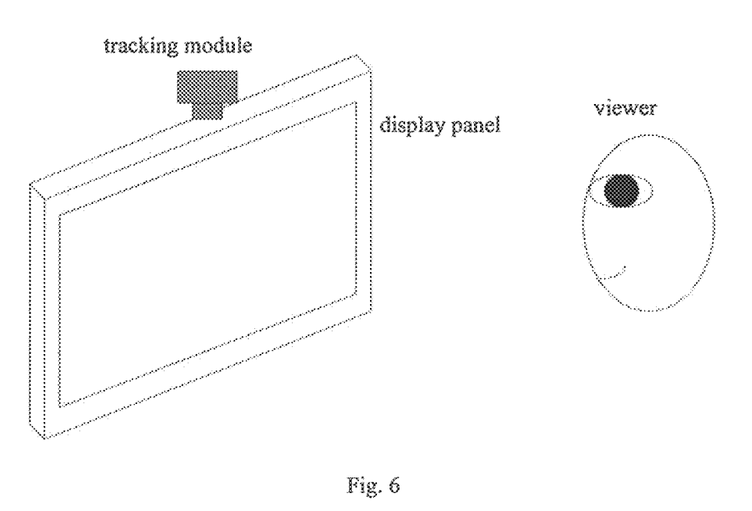
FIG. 6 schematically illustrates yet another 3D display device in accordance with an embodiment of the disclosure.
Figure 7:
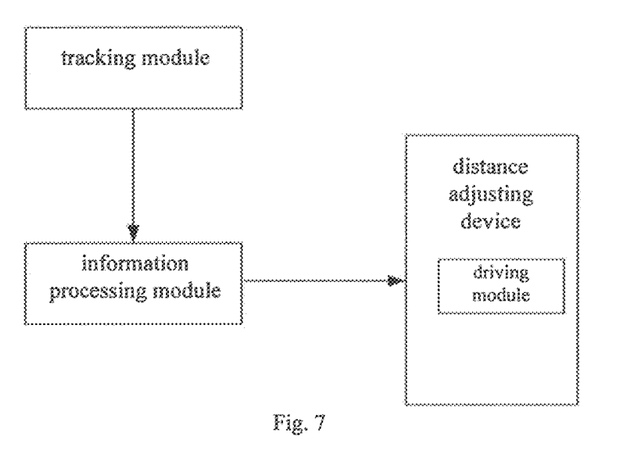
FIG. 7 schematically illustrates a block diagram of a 3D display device in accordance with an embodiment of the disclosure.

Exemplarily, as illustrated in FIG. 7, the 3D display device in the embodiment of the disclosure further comprises a tracking module which is configured for detecting the distance H between the viewer and the display panel along the light emission direction of the display device. As an example, the tracking module is a camera and disposed on the top frame of the display panel and along a direction facing the viewer as illustrated in FIG. 6.

Exemplarily, the tracking module comprises: a camera unit configured for shooting the image of the head of the viewer, and a determining unit configured for determining the position of the head according to the image shot by the camera unit and calculating the distance H between the viewer and the display panel along the light emission direction correspondingly. As an example, the camera unit employs a CMOS or CCD camera, the determining unit employs a general or customized computing device, such as a DSP processor and the like.

Exemplarily, the 3D display device in the embodiment of the disclosure further comprises an information processing module which is configured for receiving the distance H between the viewer and the display panel along the light emission direction of the display device detected by the tracking module, calculating a variation of the distance H, and calculating a variation of the distance h between the display panel and the light-splitting device according to the variation of the distance H, so as to output a distance adjusting signal. Generally, the information processing module may employ a general or customized computing device such as a DSP processor and the like. As an example, the determining unit of the tracking module and the information processing module may be realized through a same computing device.

As an example, it is possible to calculating the variation of the distance h with reference to the variation of the distance H according to the formula (1) or (2).

Exemplarily, the distance adjusting device 30 further comprises a driving module which is configured for receiving the distance adjusting signal and thereby adjusting the distance h between the display panel and the light-splitting device according to the distance adjusting signal.

Furthermore, it is noted that, the viewer may also manually operates the distance adjusting device. As an example, it is possible to control the distance adjusting device through a remote control device. When the viewing distance of the viewer changes which causes that the viewer cannot see the proper 3D image, the viewer can manually operate the remote control device to control the distance adjusting device to change the distance between the display panel and the light-splitting device until the viewer sees an clear and crosstalk-free 3D image.

Exemplarily, in the 3D display device of the embodiment of the disclosure, the display panel is an organic light emitting display panel or a liquid crystal display panel. When the display panel is an organic light emitting display panel, the light-splitting device is disposed on the light emission side of the display device. When the display panel is a liquid crystal display panel, the light-splitting device is disposed on the light emission side of the display device or between the display panel and a backlight module which provides illumination light for the display panel.

Furthermore, it is noted that, various parameters such as the width a of the pixel, the width m of the slit and the like cannot be changed generally in an existing 3D display device. However, when the 3D image is displayed, there is a viewing distance range which allows the viewer can see crosstalk-free 3D image when the viewer moves back and forth within the viewing distance range.

Exemplarily, it is possible to configure the viewing distance range according to actual requirements when using the 3D display device in the embodiment of the disclosure. If the viewer is still within the viewing distance range after he moves, the distance between the light-splitting device and the display panel does not need to change, this situation could be conceived by those skilled in the art according to actual requirements and is not limited in the embodiment of the disclosure.

The 3D display device in the embodiment of the disclosure allows the distance between the light-splitting device and the display panel to be changed through providing the distance adjusting device, thus the viewer can see clear and crosstalk-free 3D image when the viewer moves back and forth, thereby improving the stereoscopic viewing experience.

The embodiment of the disclosure further provides a method for controlling the 3D display device of any of the above embodiments. The constitution of the 3D display device can refer to the above embodiments and will not be elaborated herein for the sake of simplicity. The method for controlling the 3D display device will be described as below.

The controlling method in the embodiment of the disclosure comprises: acquiring a distance adjust signal; and adjusting, by the distance adjusting device, the distance h between the light-splitting device and the display panel along the light emission direction of the display device according to the distance adjusting signal.

Exemplarily, the step of acquiring a distance adjusting signal in the controlling method of the embodiment of the disclosure comprises: acquiring the distance adjusting signal manually inputted by a viewer. Alternatively, the above step comprises: detecting a distance H between the viewer and the display panel along the light emission direction of the display device; acquiring a variation of the distance h between the display panel and the light-splitting device according to the distance H between the viewer and the display panel along the light emission direction, to output the distance adjusting signal; transmitting the distance adjusting signal to the distance adjusting device.

Exemplarily, in the controlling method of the 3D display device in the embodiment of the disclosure, the 3D display device comprises: a tracking module which is configured for detecting the distance H between the viewer and the display panel along the light emission direction of the display device. As an example, the tracking module is a camera which is disposed on the top frame of the display panel and towards the viewer as illustrated in FIG. 6; and an information processing module which is configured for receiving the distance H between the viewer and the display panel along the light emission direction of the display device detected by the tracking module, calculating a variation of the distance H, and calculating a variation of the distance h between the display panel and the light-splitting device according to the variation of the distance H so as to output a distance adjusting signal. In this case, in the step of: detecting a distance H between the viewer and the display panel along the light emission direction of the display device and acquiring a variation of the distance h between the display panel and the light-splitting device according to the distance H between the viewer and the display panel along the light emission direction to output the distance adjusting signal; transmitting the distance adjusting signal to the distance adjusting device, the distance adjusting signal is acquired through the information processing module.

Exemplarily, the distance adjusting device in the embodiment of the disclosure comprises a driving module and a plurality of screws, the configuration and arrangement of the screws can refer to the above description. The step of adjusting the distance h between the light-splitting device and the display panel along the light emission direction of the display device according to the distance adjusting signal by the distance adjusting device may comprise: the driving module drives each of the plurality of screws to rotate according to the distance adjusting signal.

Correspondingly, after calculating the variation of the distance h, the information processing module calculates a rotation amount of the screws according to a pitch of each of the screws, thereby obtaining the distance adjusting signal.

Exemplarily, the distance adjusting device in the embodiment of the disclosure comprises the driving module and an air cushion, wherein the configuration and arrangement of the air cushion can refer to the above description. The step of adjusting the distance h between the light-splitting device and the display panel along the light emission direction of the display device according to the distance adjusting signal by the distance adjusting device may comprise: the driving module controls the air cushion to be inflated or deflated according to the distance adjusting signal.

Correspondingly, after calculating the variation of distance h, the information processing module calculates the inflation amount or deflation amount of the air cushion according to the relation between the gas storage of the air cushion and the variation of distance h, thereby obtaining the distance adjusting signal.

Exemplarily, the distance adjusting device in the embodiment of the disclosure comprises the driving module and a piezoelectric device, wherein the configuration and arrangement of the piezoelectric device can refer to the above description. The step of adjusting the distance h between the light-splitting device and the display panel along the light emission direction of the display device according to the distance adjusting signal by the distance adjusting device may comprise: the driving module controls the piezoelectric device to deform according to the distance adjusting signal.

Correspondingly, after calculating the variation of distance h, the information processing module calculates a deformation amount of the piezoelectric device, thereby obtaining the distance adjusting signal.

Exemplarily, the distance adjusting device in the embodiment of the disclosure comprises the driving module, at least one pair of magnets and at least one spring, the configuration and arrangement of which can refer to the above description. The step of adjusting the distance h between the light-splitting device and the display panel along the light emission direction of the display device according to the distance adjusting signal by the distance adjusting device may comprise: the driving module controls the two magnets of at least one pair of magnets to move by a distance of the variation of the distance h according to the distance adjusting signal.

Correspondingly, after calculating the variation of distance h, the information processing module calculates such as a current amount needed to be applied to the electromagnets corresponding to the variation of the distance h, thereby obtaining the distance adjusting signal.

Exemplarily, the distance adjusting device in the embodiment of the disclosure comprises the driving module, a cam and a follower leaning against the cam, the configuration and arrangement of which can refer to the above description. The step of adjusting the distance h between the light-splitting device and the display panel along the light emission direction of the display device according to the distance adjusting signal by the distance adjusting device may comprise: the driving module controls the cam to rotate according to the distance adjusting signal so that the follower moves a distance of the variation of the distance h with respect to its original position.

Correspondingly, after calculating the variation of distance h, the information processing module calculates a rotation amount of the cam corresponding to the variation of the distance h, thereby obtaining the distance adjusting signal.

Exemplarily, the distance adjusting signal is manually inputted by the viewer. As an example, when the distance of the viewer changes, which causes that the viewer cannot see the proper 3D image, the viewer can manually operate the remote control device to input the distance adjusting signal so that the distance adjusting device can adjust the distance between the display panel and the light-splitting device according to the distance adjusting signal until the viewer sees an clear and crosstalk-free 3D image. In this case, every time the adjustment is performed, the distance between the display panel and the light-splitting device is adjusted by a predetermined distance which is determined according to actual requirements as long as the predetermined distance reaches a certain precision.

In the 3D display device and the controlling method of a 3D display device in the embodiments of the disclosure, the distance between the display panel and the light-splitting device is adjustable. Due to the above fact, when the viewer moves back and forth relative to the display panel, the viewer can still see clear and crosstalk-free 3D image through adjusting the distance between the light-splitting device and the display panel synchronously, thus the 3D visual distance of the 3D display device in the embodiment of the disclosure is remarkably increased comparing with conventional 3D display device which has a fixed distance between the light-splitting device and the display panel, thereby greatly improving the 3D viewing experience of the viewer and broadening the application scope of the 3D display device.

What is described above is related to the illustrative embodiments of the disclosure only and not limitative to the scope of the disclosure; the scopes of the disclosure are defined by the accompanying claims.

The present application claims the priority of Chinese Patent Application No. 201510346635.1, filed on Jun. 19, 2015, the disclosure of which is incorporated herein by reference in its entirety

What is claimed is:

1. A three-dimensional display device, comprising:
    a display panel comprising a plurality of pixels arranged as an array, wherein the plurality of pixels comprises left eye pixels and right eye pixels alternately arranged in each row or each column;
    a light-splitting device disposed as being parallel to the display panel and configured for projecting lights emitted by the left eye pixels and right eye pixels to different view areas, wherein the light-splitting device is at a side facing a viewer of the display panel, and a distance h is presented between the light-splitting device and the display panel along a light emission direction of the display device;
    a distance adjusting device configured to adjust the distance h between the display panel and the light-splitting device along the light emission direction of the display device according to a variation of a distance H between the viewer and the display panel along the light emission direction of the display device,
    wherein a proportion of the distance h to the distance H is unchanged; and
    wherein the proportion of the distance h to the distance H is identical to a/(a+I), wherein a is a width of each of the plurality of pixels, and I is an interpupillary distance of the viewer.

2. The three-dimensional display device of claim 1, wherein the distance adjusting device comprises a plurality of screws, each of the plurality of screws is rotatable and has one end fixed to the display panel and the other end passing through the light-splitting device.

3. The three-dimensional display device of claim 2, wherein a plurality of screw holes having internal screw thread therein are formed in a frame of the light-splitting device, each of the screw holes corresponds to one of the screws, and each of the screws penetrates through a corresponding screw hole.

4. The three-dimensional display device of claim 1, wherein the distance adjusting device comprises an air cushion which is disposed between the display panel and the light-splitting device and corresponding to frames of the light-splitting device and the display panel, and a gas storage capacity of the air cushion is adjustable.

5. The three-dimensional display device of claim 1, wherein the distance adjusting device comprises a piezoelectric device which is disposed between the display panel and the light-splitting device and corresponding to frames of the light-splitting device and the display panel.

6. The three-dimensional display device of claim 1, wherein the distance adjusting device comprises at least one pair of magnets and at least one spring, one of two magnets of the at least one pair of magnets is an electromagnet, one of the two magnets is disposed on the display panel and the other magnet is disposed on the light-splitting device, and an end of the at least one spring is fixed on the display panel and the other end is fixed on the light-splitting device.

7. The three-dimensional display device of claim 1, wherein the distance adjusting device comprises a cam and a follower leaning against the cam, an axle of the cam is fixed on the display panel, and an end of the follower leans against the cam and the other end is fixed on the light-splitting device.

8. The three-dimensional display device of claim 2, further comprising a tracking module which is configured for detecting a distance H between the viewer and the display panel along the light emission direction of the display device.

9. The three-dimensional display device of claim 8, further comprising an information processing module which is configured for receiving the distance H between the viewer and the display panel along the light emission direction of the display device detected by the tracking module, calculating a variation of the distance H, and calculating a variation of the distance h between the display panel and the light-splitting device according to the variation of the distance H, and outputting a distance adjusting signal.

10. The three-dimensional display device of claim 9, wherein the distance adjusting device further comprises a driving module which is configured for adjusting the distance h between the display panel and the light-splitting device according to the distance adjusting signal.

11. The three-dimensional display device of claim 1, wherein the display panel is an organic light emitting display panel and the light-splitting device is disposed on a light emission side of the display panel.

12. The three-dimensional display device of claim 1, wherein the display panel is a liquid crystal display panel, the three-dimensional display device further comprises a backlight module, and the backlight module is disposed on a light incident side of the display panel.

13. The three-dimensional display device of claim 12, wherein the light-splitting device is disposed on the light emission side of the display panel or between the backlight module and the display panel.

14. A method for controlling a three-dimensional display device, wherein the three-dimensional display device comprises: a display panel comprising a plurality of pixels arranged as an array, wherein the plurality of pixels comprises left eye pixels and right eye pixels alternately arranged in each row or each column; a light-splitting device disposed as being parallel to the display panel and configured for projecting lights emitted by the left eye pixels and right eye pixels to different view areas, wherein the light-splitting device is at a side facing a viewer of the display panel, and a distance h is presented between the light-splitting device and the display panel along a light emission direction of the display device; and a distance adjusting device configured for adjusting the distance h between the display panel and the light-splitting device along the light emission direction of the display device according to a variation of a distance H between the viewer and the display panel along the light emission direction of the display device, wherein a proportion of the distance h to the distance H is unchanged, the method comprises:
acquiring a distance adjusting signal; and
adjusting, by the distance adjusting device, the distance h between the light-splitting device and the display panel along the light emission direction of the display device according to the distance adjusting signal; and
wherein the proportion of the distance h to the distance H is identical to a/(a+I), wherein a is a width of each of the plurality of the pixels, and I is an interpupillary distance of the viewer.

15. The method of claim 14, wherein acquiring a distance adjusting signal comprises:
acquiring the distance adjusting signal manually inputted by a viewer; or
detecting the distance H between the viewer and the display panel along the light emission direction of the display device; acquiring a variation of the distance h between the display panel and the light-splitting device according to the distance H between the viewer and the display panel along the light emission direction to output the distance adjusting signal; transmitting the distance adjusting signal to the distance adjusting device.

16. The method of claim 14, wherein the distance adjusting device comprises a driving module and a plurality of screws, each of the plurality of screws is rotatable and has one end being fixed to the display panel and the other end passing through the light-splitting device, and the driving module drives the plurality of screws to rotate according to the distance adjusting signal.

17. The method of claim 14, wherein the distance adjusting device comprises a driving module and an air cushion, the air cushion is disposed between the display panel and the light-splitting device and corresponds to frames of the light-splitting device and the display panel, a gas storage capacity of the air cushion is adjustable, and the driving module controls the air cushion to be inflated or deflated according to the distance adjusting signal.

18. The method of claim 14, wherein the distance adjusting device comprises a driving module, at least one pair of magnets, and at least one spring, one of two magnets of the at least one pair of magnets is an electromagnet, one of the two magnets is disposed on the display panel and the other magnet is disposed on the light-splitting device, an end of the at least one spring is fixed on the display panel and the other end is fixed on the light-splitting device, and the driving module controls two magnets of the at least one pair of magnets to move a distance of the variation of the distance h face-to-face according to the distance adjusting signal.

19. The method of claim 14, wherein the distance adjusting device comprises a driving module, a cam, and a follower leaning against the cam, an axle of the cam is fixed on the display panel, an end of the follower leans against the cam and the other end is fixed on the light-splitting device, and the driving module controls the cam to rotate according to the distance adjusting signal so that the follower moves a distance of the variation of the distance h.

* * * * *